(12) United States Patent
Watkin et al.

(10) Patent No.: US 9,599,282 B2
(45) Date of Patent: Mar. 21, 2017

(54) MAINTENANCE SYSTEM SUPPORT APPARATUS AND SUPPORT SYSTEMS

(71) Applicant: RBW Enterprises, Inc., Newnan, GA (US)

(72) Inventors: Robert B Watkin, Peachtree City, GA (US); Trey Westerhoff, Moreland, GA (US)

(73) Assignee: RBW Enterprises, Inc., Newnan, GA (US)

( * ) Notice: Subject to any disclaimer, the term of this patent is extended or adjusted under 35 U.S.C. 154(b) by 0 days.

(21) Appl. No.: 15/071,498

(22) Filed: Mar. 16, 2016

(65) Prior Publication Data

US 2016/0273704 A1   Sep. 22, 2016

Related U.S. Application Data

(60) Provisional application No. 62/134,944, filed on Mar. 18, 2015.

(51) Int. Cl.
| F16M 13/02 | (2006.01) |
|---|---|
| B24B 7/18 | (2006.01) |
| B08B 9/08 | (2006.01) |
| B23Q 9/00 | (2006.01) |

(52) U.S. Cl.
CPC ............. *F16M 13/022* (2013.01); *B08B 9/08* (2013.01); *B23Q 9/0014* (2013.01); *B24B 7/182* (2013.01)

(58) Field of Classification Search
CPC ......... B66C 1/223; B66C 5/02; A01C 23/047; A01M 7/0082; A01M 7/0042; A01M 7/0053; F16M 13/022; B24B 7/182; B23Q 9/0014; B08B 9/08

USPC .............. 248/646, 121, 127, 129, 647, 651; 212/324, 326; 239/159, 164; 52/749.12; 451/64, 75, 92, 340, 351
See application file for complete search history.

(56) References Cited

U.S. PATENT DOCUMENTS

| 1,947,286 A | 2/1934 | Bitterbaum |
|---|---|---|
| 2,075,369 A | 3/1937 | Stetler |
| 2,098,262 A | 11/1937 | Temple |
| 2,326,264 A | 8/1943 | Stetler |
| 2,415,500 A | 2/1947 | Kennison |
| 2,543,348 A | 2/1951 | Briese |
| 3,147,143 A | 9/1964 | Kontani et al. |

(Continued)

FOREIGN PATENT DOCUMENTS

ES   WO2013175036 A1   11/2013

OTHER PUBLICATIONS

Watkin; Robert B.; "Floating Roof Fixture"; Jun. 2003; RBW Enterprises, Inc.; Newnan, Georgia, USA.

(Continued)

*Primary Examiner* — Tan Le
(74) *Attorney, Agent, or Firm* — Thomas B. McGurk

(57) ABSTRACT

Support systems and apparatus that can be used to support maintenance systems usable on the internal side of the sidewall of external floating roof tanks are provided. The support systems can include at least one stanchion that is mounted on a carriage for moving the maintenance system around the sidewall of an external floating roof tank and two or more internal wall contact stabilizers that are adjustably positioned relative to the carriage for aligning the system in place.

19 Claims, 12 Drawing Sheets

(56) References Cited

U.S. PATENT DOCUMENTS

| | | | |
|---|---|---|---|
| 3,161,309 A * | 12/1964 | Baudhuin | B66C 1/223 |
| | | | 212/324 |
| 3,262,228 A | 7/1966 | Schenck | |
| 3,396,423 A | 8/1968 | Hope | |
| 3,558,172 A * | 1/1971 | Lamer et al. | B66C 1/223 |
| | | | 212/326 |
| 3,581,441 A | 6/1971 | Hulbert, Jr. | |
| 3,863,393 A | 2/1975 | Goff | |
| 4,199,905 A * | 4/1980 | Neidigh | B08B 9/08 |
| | | | 451/92 |
| 4,358,020 A * | 11/1982 | Thiele | B66C 19/007 |
| | | | 212/326 |
| 4,749,328 A * | 6/1988 | Lanigan, Jr. | B66C 1/223 |
| | | | 212/326 |
| 5,020,714 A * | 6/1991 | Miles | B23K 37/0443 |
| | | | 100/226 |
| 5,367,841 A | 11/1994 | Smith et al. | |
| 5,518,553 A | 5/1996 | Moulder | |
| 5,716,261 A | 2/1998 | Watkin | |
| 5,901,720 A | 5/1999 | Lange | |
| 6,675,548 B2 * | 1/2004 | Bristol | B24C 1/06 |
| | | | 239/11 |
| 8,894,467 B2 | 11/2014 | Santure | |
| 2006/0174830 A1 | 8/2006 | van Houten | |
| 2011/0174794 A1 * | 7/2011 | Doskocz | B23K 37/0223 |
| | | | 219/136 |
| 2016/0273704 A1 * | 9/2016 | Watkin | F16M 13/022 |

OTHER PUBLICATIONS

Blastrac of North America; "900VMB Steel Shot Blasting Systems: Vertical Shot Blasting"; www.blastrac.com; 2015; 1 page; Blastrac of North America;Oklahoma City, Oklahoma, USA.

* cited by examiner

MAINTENANCE SYSTEM SUPPORT APPARATUS AND SUPPORT SYSTEMS

RELATED APPLICATION

This application claims the benefit of priority to U.S. Provisional Application No. 62/134,944 filed Mar. 18, 2015. The provisional application identified above is hereby incorporated by reference in its entirety herein to provide continuity of disclosure.

TECHNOLOGICAL FIELD

The present disclosure relates to systems for maintaining tanks, and, in particular, to support apparatus and support systems on which tank maintenance systems can be mounted and used.

BACKGROUND

An external floating roof tank is a type of storage tank that is configured to reduce the incidence of emissions of volatile compounds of product, such as petroleum-based materials, stored in the tank. The external floating roof of such a tank is designed to move vertically while maintaining a seal with the sidewall of the tank, so as to minimize the headspace of the internal tank volume. In some cases, the roof structure includes pontoons built therein that allow the roof to float directly on the surface of the product contained within the tank. Due to the configuration of the external floating roof, conventional maintenance systems used to clean or paint the sidewalls of storage tanks cannot be safely and secured mounted directly on the roof in order to carry out maintenance operations. Consequently, cranes are oftentimes used to raise a worker into position to clean or paint the internal side of the sidewall of an external floating roof tank, thereby making maintenance of such tanks more difficult, costly, and potentially hazardous.

Accordingly, there is a need for a support apparatus and support system that can be employed with various tank maintenance systems that can address one or more such limitations.

SUMMARY

The present disclosure encompasses maintenance system support apparatus and support systems that can be used to support various maintenance systems, such as blasting systems and paint systems, when used on the internal or both the internal and external sides of the sidewall of an external floating roof tank.

The present disclosure encompasses a support system for supporting a maintenance system on an external floating roof tank comprising, consisting essentially of and/or consisting of a carriage, wherein the carriage comprises a first carriage side, a second carriage side, a first carriage end and a second carriage end, a plurality of wheels, wherein the carriage is movably mounted on the plurality of wheels, a first internal leg and a second internal leg mounted on the carriage, wherein the first internal leg and the second internal leg are proximal to the first carriage side and distal to the second carriage side, a first internal wall contact stabilizer mounted on the first internal leg, a second internal wall contact stabilizer mounted on the second internal leg, wherein the first internal wall contact stabilizer and the second internal wall contact stabilizer are aligned inferior and lateral to the plurality of wheels, and wherein the first internal wall contact stabilizer and the second internal wall contact stabilizer are aligned proximal to the first carriage side and distal to the second carriage side, a maintenance system support mounted on the carriage, and wherein at least a portion of the maintenance system support is aligned superior and intermediate to the first internal wall contact stabilizer and the second internal wall contact stabilizer. In another aspect, the support system further can comprise, consist essentially of and/or consist of a support bracket adjustably mounted on the maintenance system support. In a further aspect, the support bracket can be adjustably movable from a first alignment proximal to the first carriage side to a second alignment distal to the first carriage side. In yet another aspect, the support system further can comprise, consist essentially of and/or consist of a hoist mounted on the maintenance system support. In another aspect, the hoist can be aligned superior to the first internal wall contact stabilizer and the second internal wall contact stabilizer. In still a further aspect, the first internal leg and the second internal leg can be adjustably mounted on the carriage, wherein the first internal leg and the second internal leg are adjustably movable from a first alignment proximal to the first carriage side to a second alignment distal to the first carriage side. In yet another aspect, the support system further can comprise, consist essentially of and/or consist of a first external wall contact stabilizer mounted on the carriage, wherein the first external wall contact stabilizer is aligned proximal to the first carriage side and distal to the second carriage side, and wherein the first external wall contact stabilizer is intermediate the carriage and the first and second internal wall contact stabilizers. In a further aspect, the support system further can comprise, consist essentially of and/or consist of a first external leg and a second external leg mounted on the carriage, wherein a portion of the first external leg and a portion of the second external leg are aligned proximal to the second carriage side and distal to the first carriage side, a second external wall contact stabilizer mounted on the first external leg, a third external wall contact stabilizer mounted on the second external leg, wherein the second external wall contact stabilizer and the third external wall contact stabilizer are aligned inferior to the plurality of wheels, and wherein the second external wall contact stabilizer and the third external wall contact stabilizer are aligned proximal to the first carriage side and distal to the second carriage side. In another aspect, the support system further can comprise, consist essentially of and/or consist of a second maintenance system support mounted on the third and second external legs. In still a further aspect, the support system further can comprise, consist essentially of and/or consist of a hoist mounted on the second maintenance system support. In another aspect, the system further can comprise, consist essentially of and/or consist of a first maintenance system mounted on the maintenance system support and a second maintenance system mounted on the second maintenance system support. In another aspect, at least one of the plurality of wheels is remote-controlled. In yet another aspect, the carriage, the maintenance system support, the first internal leg, the second internal leg, the first internal wall contact stabilizer and the second internal wall contact stabilizer can cooperate to define a wall alignment slot therebetween. In one aspect, the maintenance system support, the first internal wall contact stabilizer and the second internal wall contact stabilizer can cooperate to define a maintenance system clearance space therebetween, wherein the maintenance system clearance space is aligned adjacent to the wall alignment slot.

The present disclosure also encompasses a support system for supporting a maintenance system usable on an external floating roof tank comprising, consisting essentially of and/or consist of a carriage comprising a first carriage side, a second carriage side opposed to the first carriage side, a first carriage end and a second carriage end opposed to the first carriage end, a first wheel and a second wheel operably connected to the carriage, wherein the carriage is movably supported on the first wheel and the second wheel, a maintenance system support mounted on the carriage, wherein the maintenance system support comprises a first support beam and a second support beam, wherein the first support beam and the second support beam are aligned superior to and extend laterally from the first carriage side, a stanchion mounted to the first support beam, wherein the stanchion comprises a first internal leg, a second internal leg spaced apart from the first internal leg, a cross-member disposed between and connected to the first internal leg and the second internal leg, wherein the cross-member is aligned superior to the maintenance system support, wherein the first internal leg and the second internal leg are aligned proximal to the first carriage side and distal to the second carriage side, and wherein the first internal leg and the second internal leg are spaced apart from the first carriage side; and, a first internal wall contact stabilizer mounted to the first internal leg and a second internal wall contact stabilizer mounted to the second internal leg, wherein the first internal wall contact stabilizer and the second internal wall contact stabilizer are aligned proximal to the first carriage side and distal to the second carriage side, and the first internal wall contact stabilizer and the second internal wall contact stabilizer are aligned inferior to the first wheel and the second wheel, wherein the first internal wall contact stabilizer and the second internal wall contact stabilizer are aligned lateral to the first carriage side, wherein the carriage, the maintenance system support, the first internal leg, the second internal leg, the first internal wall contact stabilizer and the second internal wall contact stabilizer cooperate to define a wall alignment slot therebetween, and wherein the maintenance system support, the first internal wall contact stabilizer and the second internal wall contact stabilizer cooperate to define a maintenance system clearance space therebetween, wherein the maintenance system clearance space is aligned adjacent to the wall alignment slot. In one aspect, the stanchion can be adjustably mounted to the maintenance system support. In another aspect, the support system further can comprise, consist essentially of and/or consist of a first support bracket connected to the first support beam and a second support bracket connected to the second support beam. In another aspect, the support system further can comprise, consist essentially of and/or consist of a hoist mounted on the maintenance system support. In a further aspect, the support system further can comprise, consist essentially of and/or consist of a first external wall contact stabilizer mounted on the carriage, wherein the first external wall contact stabilizer is aligned proximal to the first carriage side and distal to the second carriage side, and wherein the first external wall contact stabilizer is intermediate the carriage and the first and second internal wall contact stabilizers. In still a further aspect, the support system further can comprise, consist essentially of and/or consist of a first external leg and a second external leg mounted on the carriage, wherein a portion of the first external leg and a portion of the second external leg are aligned proximal to the second carriage side and distal to the first carriage side, a second external wall contact stabilizer mounted on the first external leg, a third external wall contact stabilizer mounted on the second external leg, wherein the second external wall contact stabilizer and the third external wall contact stabilizer are aligned inferior to the first wheel and the second wheel, and wherein the second external wall contact stabilizer and the third external wall contact stabilizer are aligned proximal to the first carriage side and distal to the second carriage side.

The present disclosure also encompasses a support apparatus for attachment to a support system for supporting a maintenance system along an internal side of a sidewall of an external floating roof tank, wherein the support apparatus comprises, consists essentially of and/or consists of the aspects of the above maintenance system support system.

These and other aspects of the present disclosure are set forth in greater detail below and in the drawings for which a brief description is provided as follows.

DETAILED DESCRIPTION

The present disclosure is directed to maintenance system support apparatus and support systems that can be used to support maintenance systems, such as blasting and painting systems, used to maintain external floating roof tanks and other structures that include high sidewalls. External floating roof tanks typically include a wind girder or similar structure extending around all or part the sidewall, and can crown the sidewall, of the tank. The support apparatus and support systems encompassed by the present disclosure can be mounted on the wind girder of an external floating roof tank and support blasting and/or painting systems that can be lowered and raised along the internal surface of the sidewall of an external floating roof tank. The present disclosure encompasses maintenance system support systems that include two or more internal wall contact stabilizers that are aligned inferior the carriage of the support system and that can engage the internal surface of a sidewall of an external floating roof tank. The present disclosure also encompasses maintenance system support systems that include adjustable stanchions that allow for the repositioning of the internal wall contact stabilizers relative to the carriage of the support system.

As used herein, the term "superior" refers to an alignment higher in position, but is not limited to an alignment directly above. As used herein, the term "inferior" refers to an alignment lower in position, but is not limited to an alignment directly below. As used herein, the term "lateral" refers to an alignment that is to one side, but is not limited to an alignment at the same height. As used herein, the term "intermediate" refers to an alignment between two points or objects, but is not limited to an linear alignment between the two points or objects. As used herein, the term "plurality" refers to two or more. As used herein, the term "proximal" refers to an alignment near or toward a point or an object, and the term "distal" refers to an alignment away from or far from a point or an object. As used herein, the term "stanchion" refers to an upright support structure that includes one or more legs. As used herein, the phrase "mounted on" refers to positioning of a first object on a second object, wherein the second object supports directly or indirectly the first object, and can include the connection of the first object to the second object, as well as no direct physical contact between the first and second objects.

Figure 1:
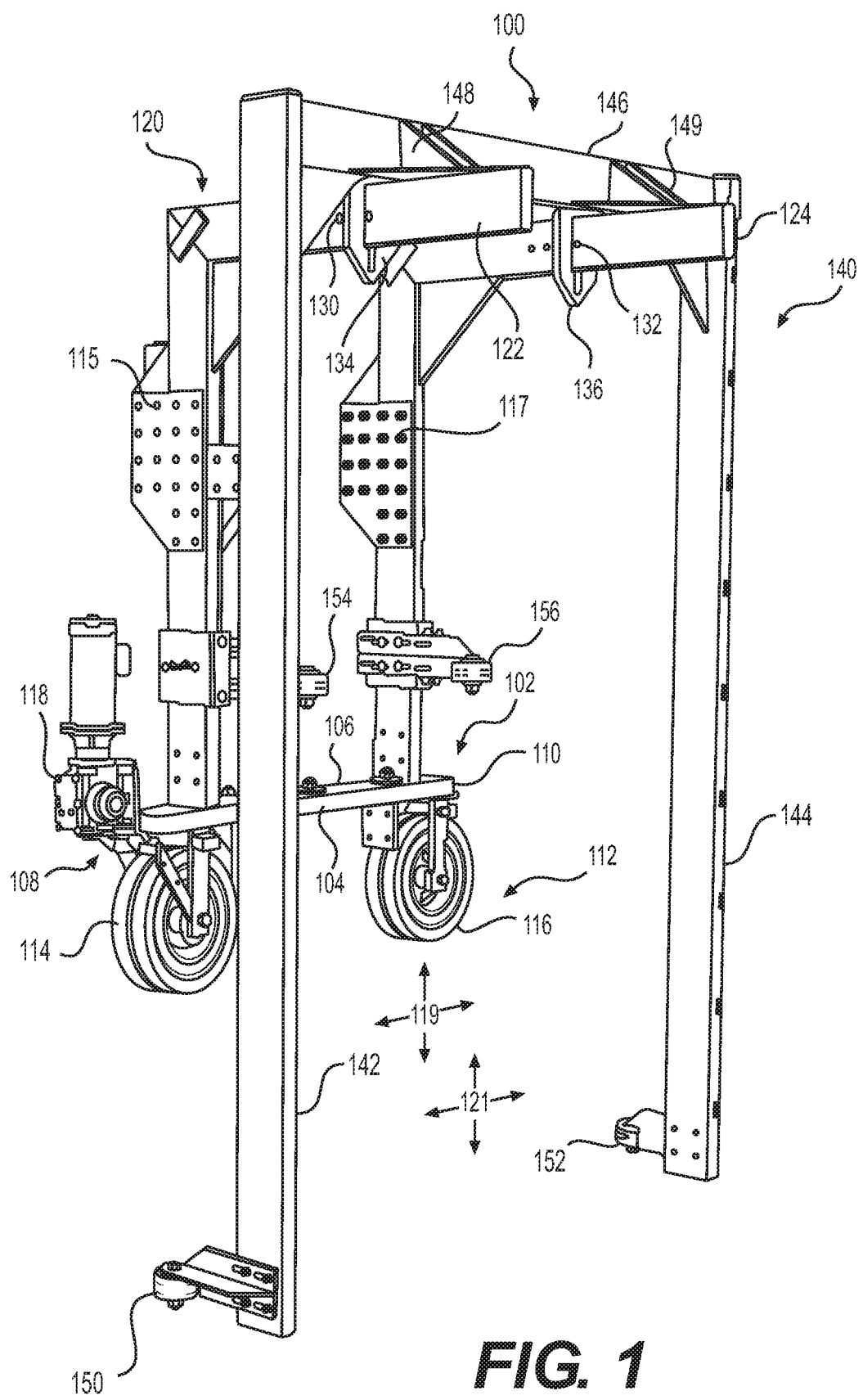
FIG. 1 is a perspective view of a maintenance system support system encompassing aspects of the present disclosure.
Figure 2:
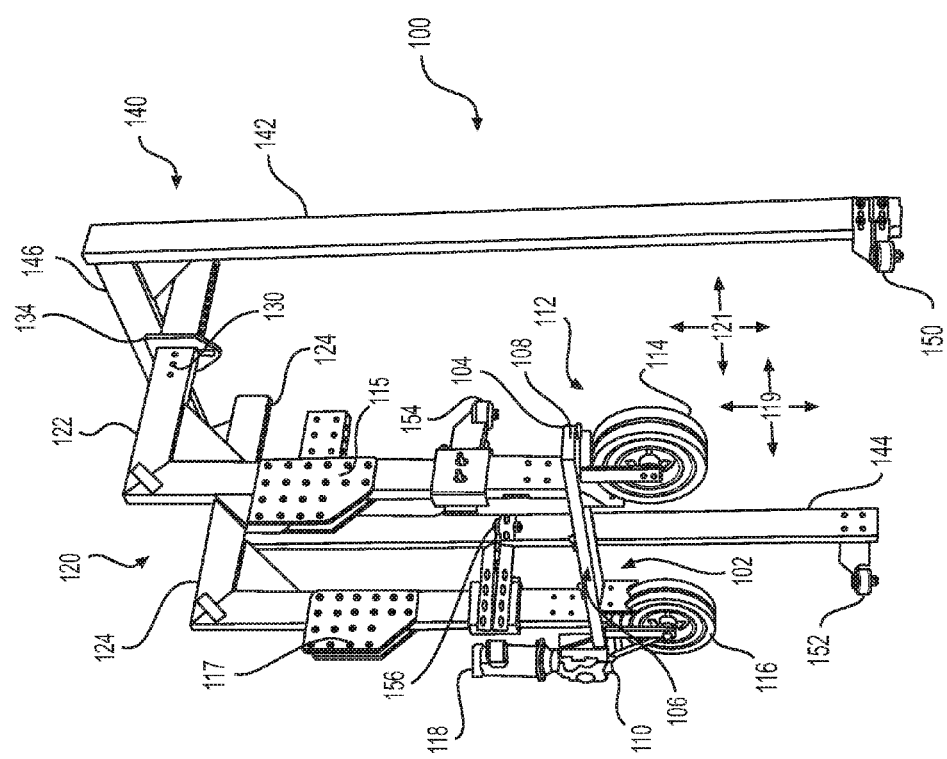
FIG. 2 is another perspective view of the maintenance system support system shown in FIG. 1 with the actuator mounted on the second carriage end of the carriage.
Figure 3:
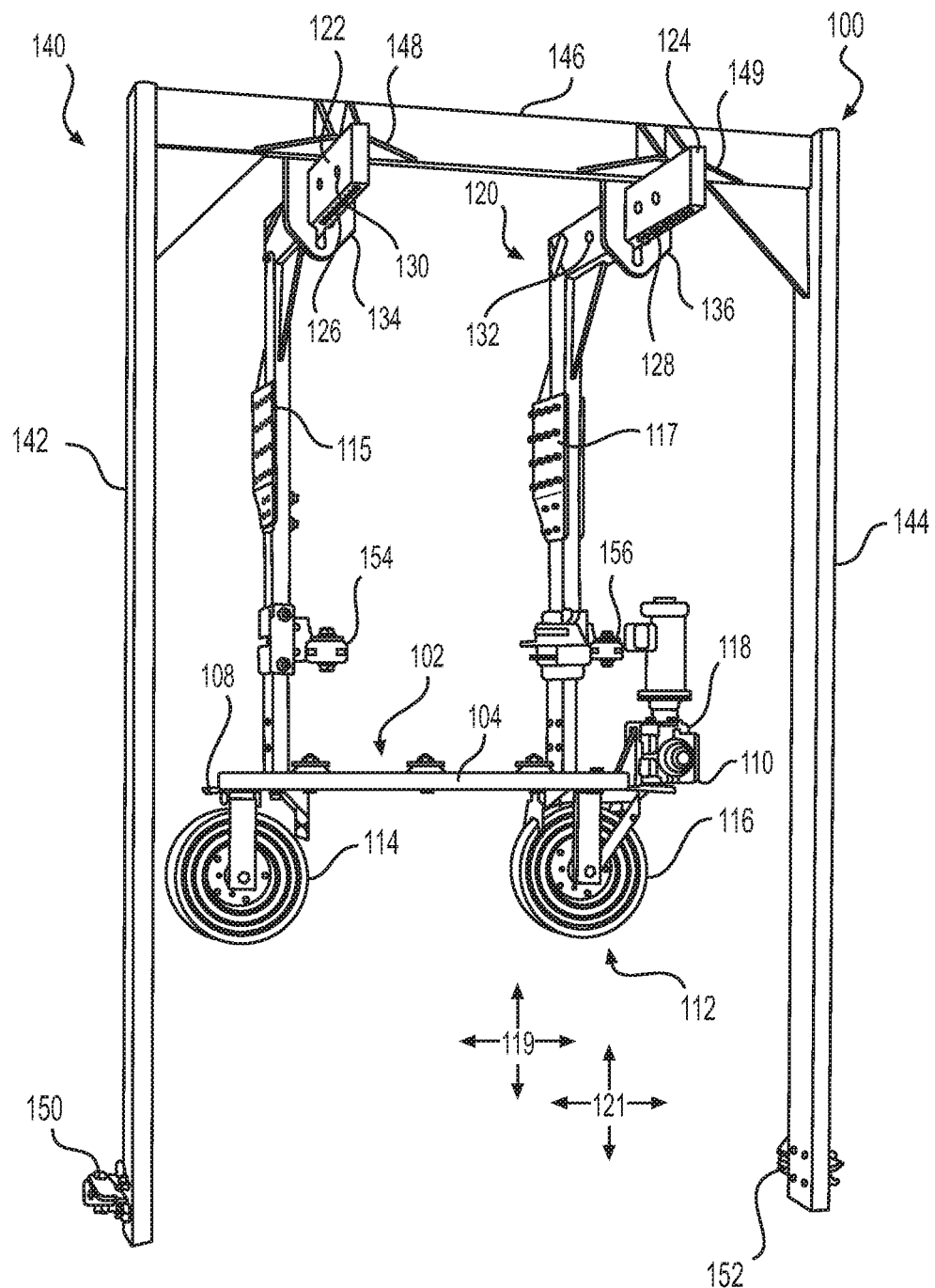
FIG. 3 is yet another perspective view of the maintenance system support system shown in FIG. 2.

FIGS. 1-3 show a maintenance system support system 100 encompassing aspects of the present disclosure. The base of the support system 100 is a carriage 102 that includes a first carriage side 104, an opposed second carriage side 106, a first carriage end 108 and a second carriage end 110 opposed to the first carriage end 108. The entire support system 100 is movable on a plurality of wheels 112 that can include a first wheel 114 aligned proximal to the first carriage end 108 of the carriage 102 and a second wheel 116 aligned proximal to the second carriage end 110 of the carriage 102. The present disclosure encompasses support systems that include plurality of wheels that include more than two wheels, casters or similar rollers. An actuator 118 can be mounted on the carriage 102 and operably connected to one or more wheels 114 and/or 116 to control the movement of the wheels. The actuator 118 can be remote-controlled so that a human operator can move the support system 100 during operation without direct contact.

A first external wall contact stabilizer 154 and a second external wall contact stabilizer 156 are mounted on the carriage 102. The first and the second external wall contact stabilizers 154 and 156 are aligned superior to the plurality of wheels 112 and lateral to the first carriage side 104 of the carriage 142. Each of the first and the second wall contact stabilizers 154 and 156 can comprise a roller that revolves on a vertical axis and can be configured to contact the external surface of the sidewall of an external floating roof tank.

Mounted on the carriage 102 is a maintenance system support 120. The maintenance system support 120 is configured to support a maintenance system, such as a sandblaster or paint sprayer, on an internal side of a sidewall of an external floating roof tank. The maintenance system support 120 is configured to extend laterally from the first carriage side 104 of the carriage 102 and is aligned superior to the carriage 102. The maintenance system support 120 can include one or more support beams. As shown in FIGS. 1-3, the maintenance system support 120 of the maintenance system support system 100 comprises a first support beam 122 and a second support beam 124 spaced apart from the first support beam 122 and aligned parallel thereto. Both the first support beam 122 and the second support beam 124 are mounted on the carriage 102 and extend laterally from the first carriage side 104 of the carriage 102. The first support beam 122 includes a first plurality of support bracket adjustment holes 130 formed opening on either side of the first support beam 122 and a first plurality of stanchion adjustment holes 126 extending through the top and bottom of the first support beam 122. The first plurality of support bracket adjustment holes 130 is configured to allow for the adjustable repositioning of a first support bracket 134 mounted on the first support beam 122. The first support bracket 134 is configured to support a hoist and/or a maintenance system thereon. The first plurality of support bracket adjustment holes 130 allow for the support bracket 134 to be moved toward and/or away from the carriage 102. Likewise, the second support beam 124 includes a second plurality of support bracket adjustment holes 132 formed in either side of the second support beam 124, as well as a second plurality of stanchion adjustment holes 126 formed in the top and bottom of the second support beam 124. The second plurality of support bracket adjustment holes 132 is configured to allow for the adjustable repositioning of a second support bracket 136 mounted on the second support beam 124. The second support bracket 136 also is configured to support a hoist and/or a maintenance system thereon. The second plurality of support bracket adjustment holes 132 allow for the second support bracket 136 to be moved toward and/or away from the carriage 102.

A stanchion 140 is adjustably mounted on the maintenance system support 120 and aligned lateral of the first side of the carriage 102. The stanchion 140 comprises a cross-member 146 extending laterally between a first internal leg 142 and a second internal leg 144 of the stanchion 140. The cross-member 146 comprises a first bracket 148 and a second bracket 149 that can be aligned with the first and second support beams 122 and 124, respectively, so as to secure the stanchion 140 to the maintenance support 120 with one or more fasteners. The first internal leg 142 is spaced apart and aligned parallel to the second internal leg 144. A first internal wall contact stabilizer 150 is mounted on the first internal leg 142, and a second internal wall contact stabilizer 152 is mounted on the second internal leg 144 of the stanchion 140. The first internal wall contact stabilizer 150 is spaced apart from the second internal wall contact stabilizer 152. Each of the first and the second internal wall contact stabilizers 150 and 152 comprises a roller that is configured to revolve around a vertical axis and engage the internal surface of the sidewall of an external floating roof tank. The first and the second internal wall contact stabilizers 150 and 152 are aligned inferior to the plurality of wheels 112 and lateral of the first carriage side 108 so as to engage the internal side of the sidewall of an external floating roof tank and stabilize the position of the support system 100 when in operation.

The carriage 102, the maintenance system support 120, the first internal wall contact stabilizer 150 and the second internal wall contact stabilizer 152 cooperate to define a wall alignment slot 119 in which a portion of a sidewall of an external floating roof tank can be aligned when the maintenance system support system 100 is operably aligned on the sidewall. In another aspect, the first external wall contact stabilizer 154 and the second external wall contact stabilizer 156 also can cooperate with the carriage 102, the maintenance system support 120, the first internal wall contact stabilizer 150 and the second internal wall contact stabilizer 152 cooperate to define the wall alignment slot 119. In this configuration, a sidewall 500 can be aligned with the first and second external wall contact stabilizers 154 and 156 positioned on the external side of the sidewall and with the first and the second internal wall contact stabilizers 150 and 152 positioned on the internal side of the sidewall. Furthermore, the maintenance system support 120, the first internal wall contact stabilizer 150 and the second internal wall contact stabilizer 152 cooperate to define a maintenance system clearance space 121 that is intermediate and superior to the first internal wall contact stabilizer 150 and the second internal wall contact stabilizer 152. The maintenance system clearance space 121 is aligned adjacent to the wall alignment slot 119 so that a maintenance system can be operably positioned adjacent an internal surface of a sidewall when the system is used.

Figure 4:
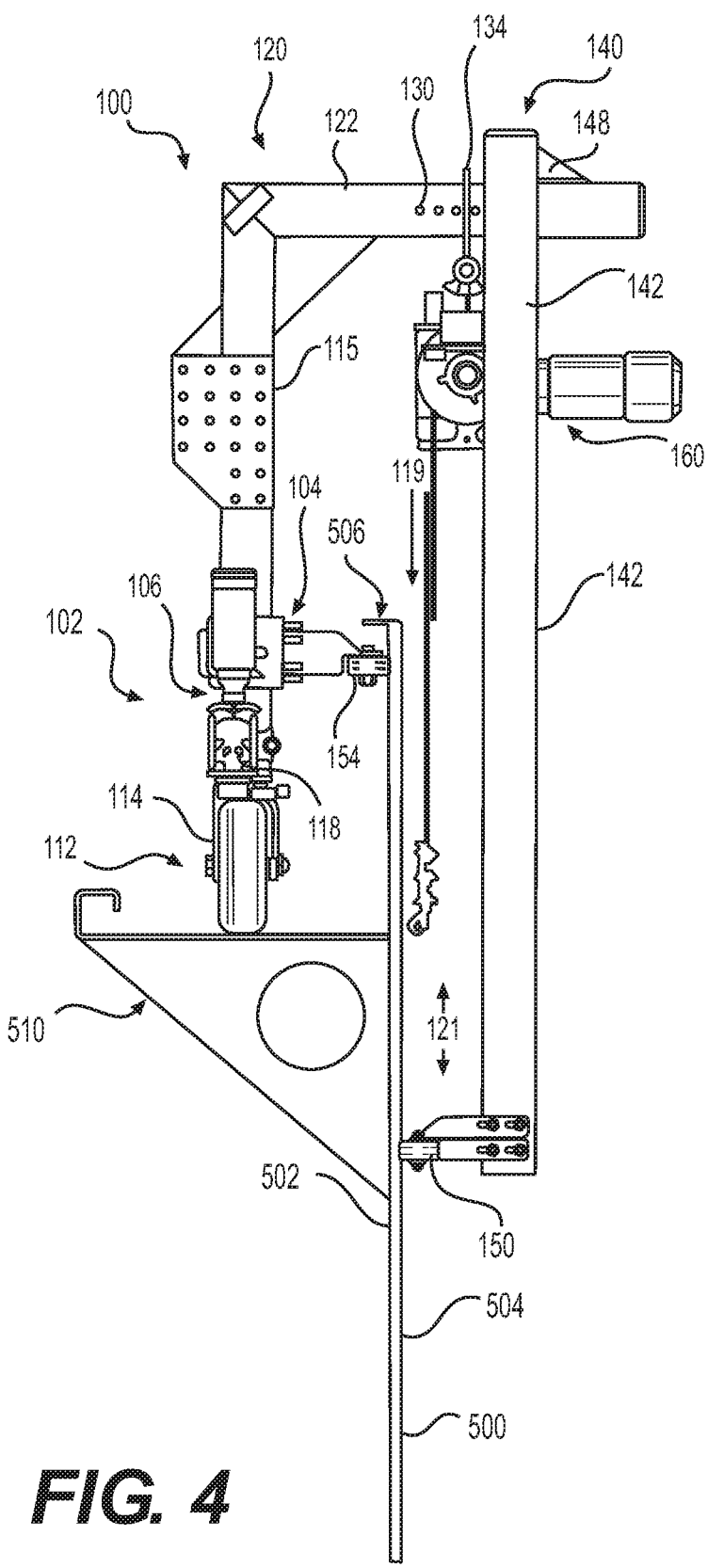
FIG. 4 is a side elevation view of the maintenance system support system of FIG. 1, wherein the maintenance system support system is mounted on an external floating roof tank and wherein the system further comprises an internal hoist.

As shown in FIG. 4, the maintenance system support system can be mounted on the wind girder 510 of an external floating roof tank with the carriage 102 aligned on the external side of the sidewall 500, the maintenance system support 120 aligned superior to the wall top 506 and the stanchion 140 aligned on the internal side of the sidewall 500. In this arrangement, the plurality of wheels 112 are positioned on the wind girder 510 and support the carriage 102 thereon with the first side 104 of the carriage facing the external surface 502 of the sidewall 500. The sidewall 500 is aligned within the wall alignment slot 119 with the first external wall contact stabilizer 154 contacting the external surface 502 of the sidewall 500 and the first internal wall contact stabilizer 150 contacting the internal surface 504 of the sidewall 500. The first internal wall contact stabilizer 150 is aligned inferior to the carriage 102 and the plurality of wheels 112. A hoist 160 is mounted on the support brackets 134 and 136 and supported by the maintenance system support 120. The support bracket 134 can be adjustably positioned by engagement of the appropriate hole of the first plurality of support bracket adjustment holes 130 so as to align the hoist 160 in an operable position to support a maintenance system, not shown, in the maintenance system clearance space 121 adjacent the internal surface 504 of the sidewall 500.

Figure 5:
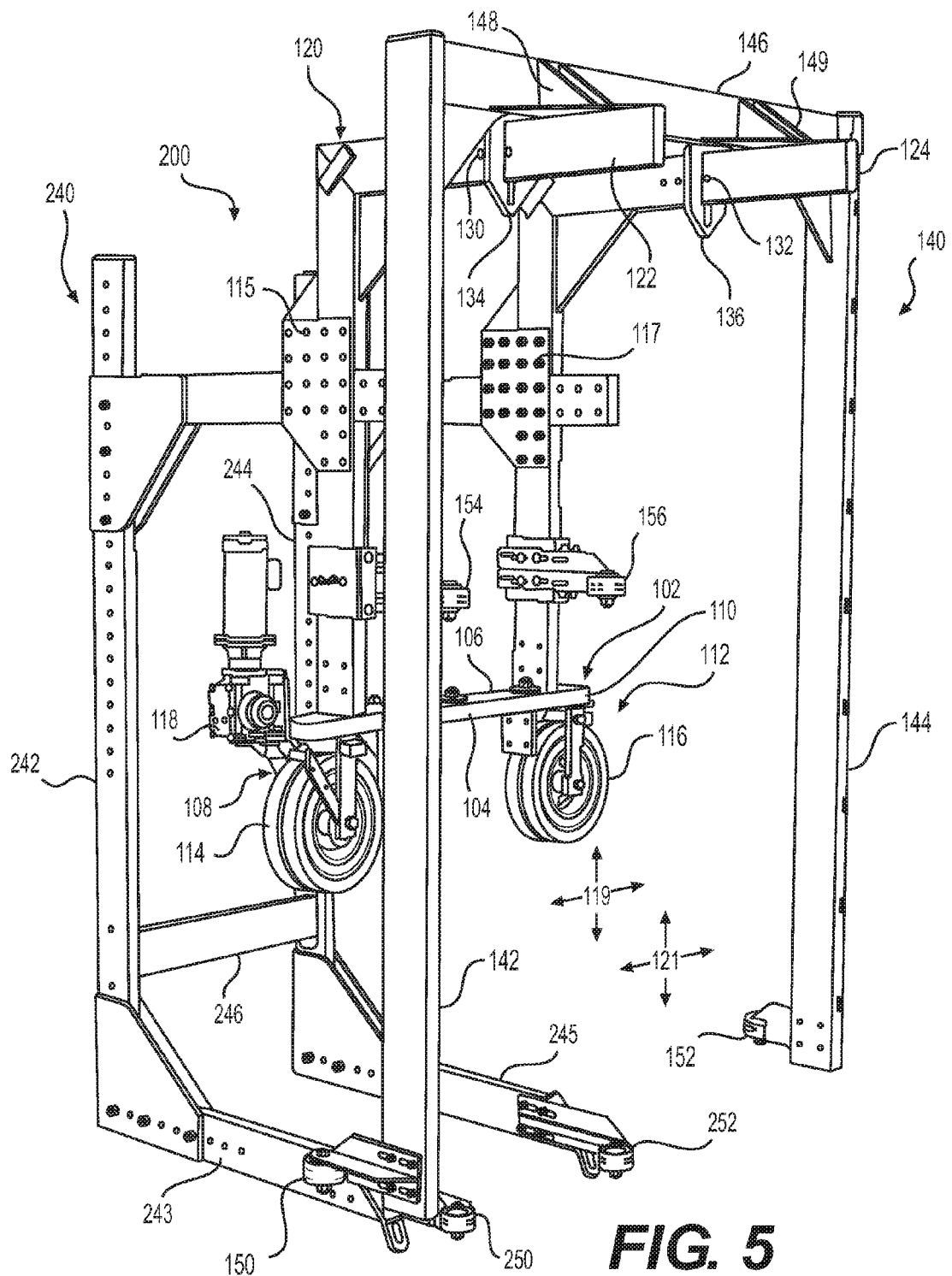
FIG. 5 is a perspective view of another maintenance system support system encompassing aspects of the present disclosure.
Figure 6:
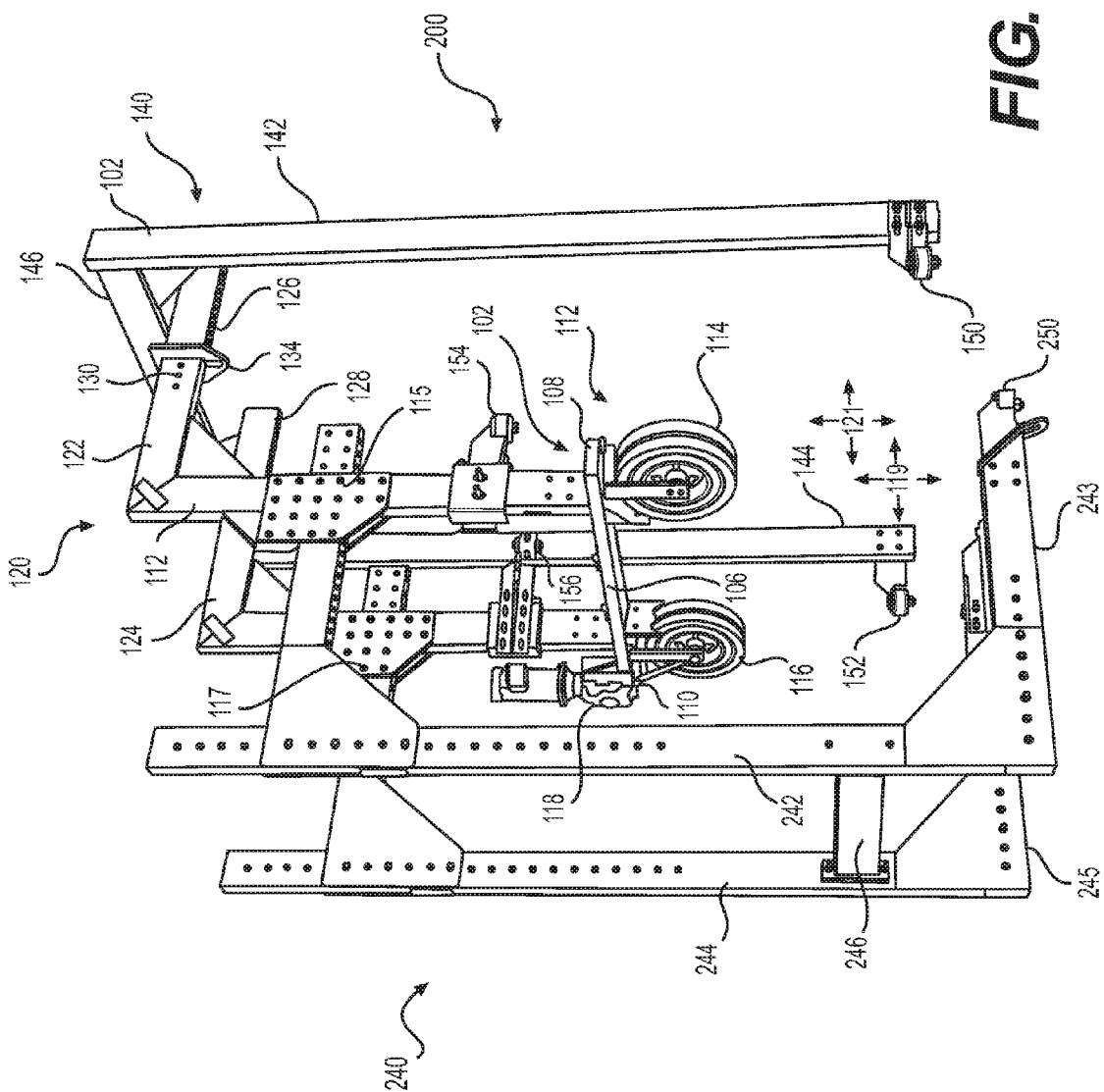
FIG. 6 is another perspective view of the maintenance system support system shown in FIG. 5 with the actuator mounted on the second carriage end of the carriage.
Figure 7:
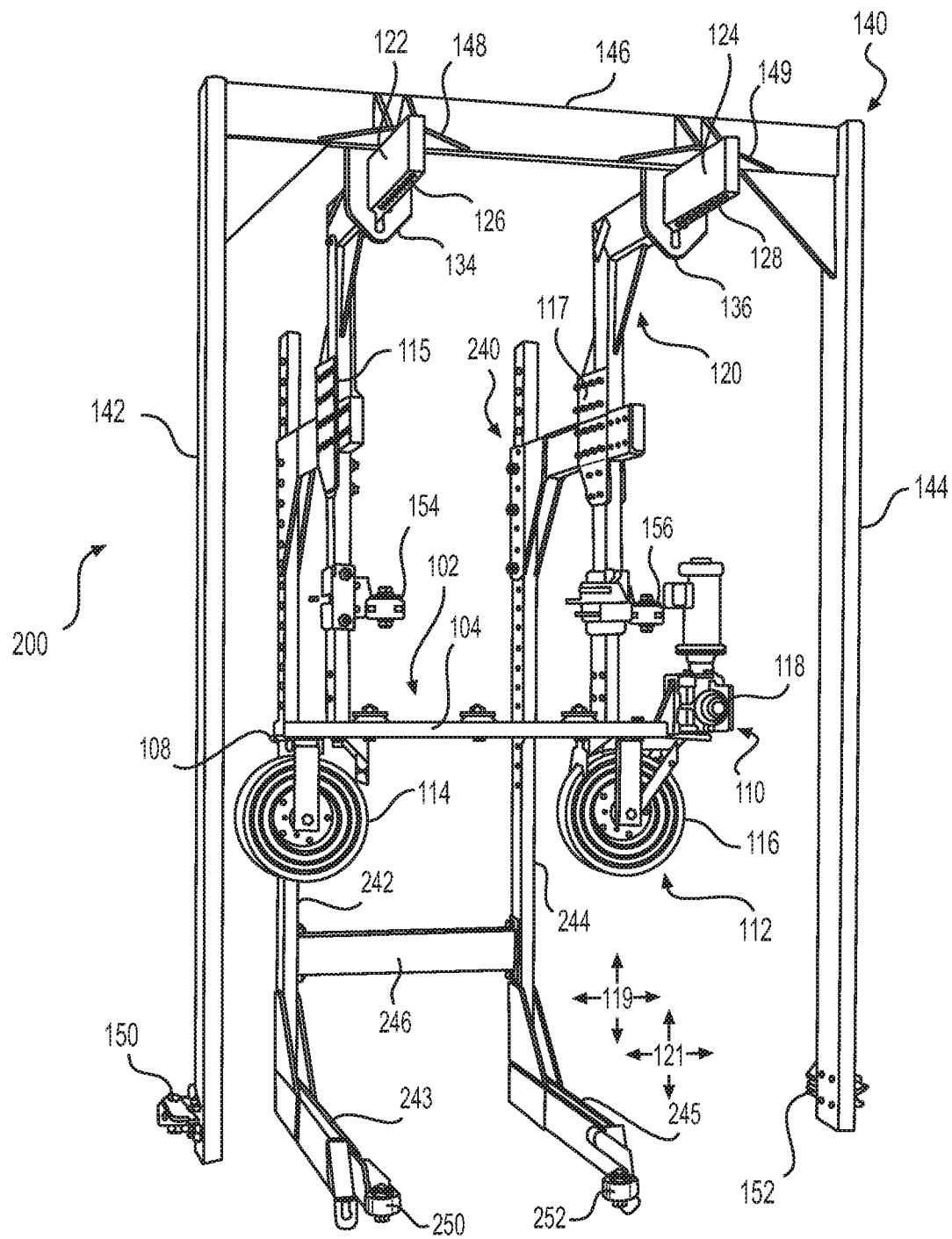
FIG. 7 is yet another perspective view of the maintenance system support system shown in FIG. 6.

FIGS. 5-7 show another maintenance system support system 200 encompassing aspects of the present disclosure. The maintenance system support system 200 includes all of the components of the maintenance system support system 100 shown in FIGS. 1-4, but also includes a second stanchion 240 that is mounted on the carriage 102 and is aligned external to a wall of an external floating roof tank when the maintenance system support system 200 is used thereon. The second stanchion 240 extends from the second carriage side 106 of the carriage 102 and comprises a first external leg 242, a second external leg 244 spaced apart from the first external leg 242 and an external cross-member 246 extending between the first and the second external legs 242 and 244. A first foot 243 is connected to the first external leg 242 and is aligned inferior to the carriage 102 and the plurality of wheels 112 and extends laterally from the first external leg 242 either to or beyond the first side 104 of the carriage 102. A third external wall contact stabilizer 250 is mounted on the first foot 243. A second foot 245 is connected to the second external leg 244 and extends therefrom either to or beyond the first side 104 of the carriage 102. A fourth external wall contact stabilizer 252 is mounted on the second foot 245. Each of the third and the fourth wall contact stabilizers 250 and 252 can comprise a roller rotatable about a vertical axis.

In one aspect, the first, second, third and fourth external wall contact stabilizers 154, 156, 250 and 252, respectively, can be aligned within a plane. In another aspect, the first external wall contact stabilizer 154, the second external wall contact stabilizer 156, the third external wall contact stabilizer 250, the fourth external wall contact stabilizer 252, the first internal wall contact stabilizer 150, second internal wall contact stabilizer 152 and the maintenance system support 120 can cooperate to define the wall alignment slot 119. In another aspect, each of the first, second, third and fourth external wall contact stabilizers 154, 156, 250 and 252, respectively, and the first and second internal wall contact stabilizers 150 and 152 can be adjustably mounted on the first and second stanchions 140 and 240, respectively, so as to adjust there position relative to the carriage 102 and to adjust the width of the wall alignment slot 119 and the position of the wall alignment slot 119 relative to the carriage 102.

Figure 8:
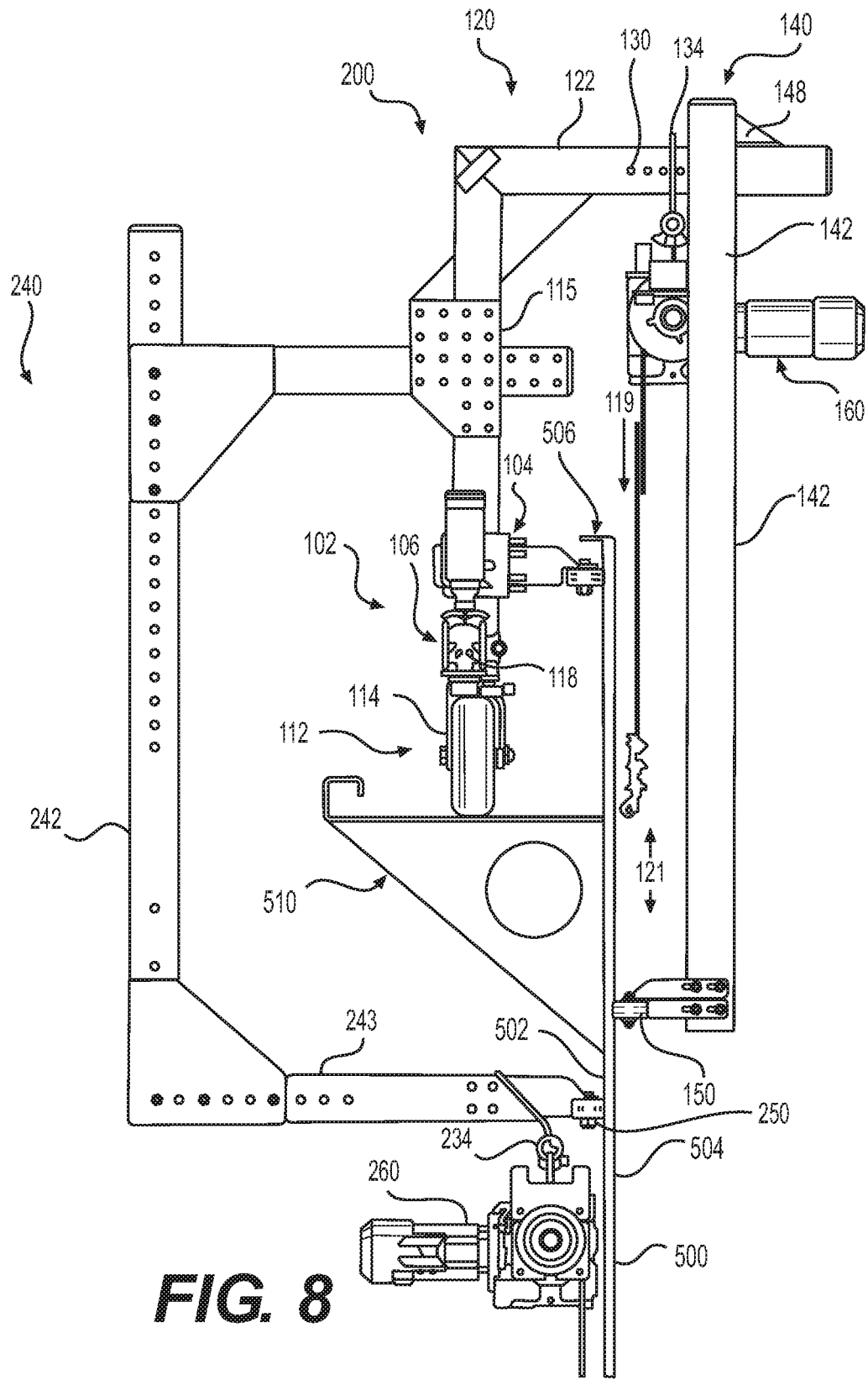
FIG. 8 is a side elevation view of the maintenance system support system shown in FIG. 5, wherein the maintenance system support system is mounted on an external floating roof tank, and wherein the maintenance system support system further comprises an internal hoist and an external hoist.
Figure 10:
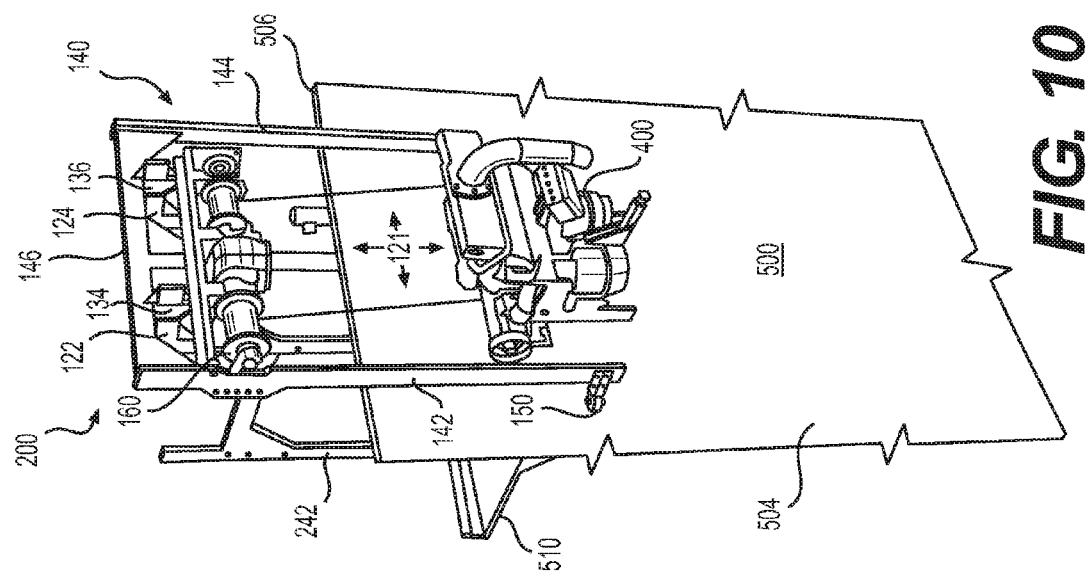
FIG. 10 is another perspective cutaway view of the portion of the external floating roof tank shown in FIG. 9 with a representation of the maintenance system support system mounted thereon, and wherein a second maintenance system is mounted on and supported by the maintenance system support system internal to the sidewall of the external floating roof tank.
Figure 9:
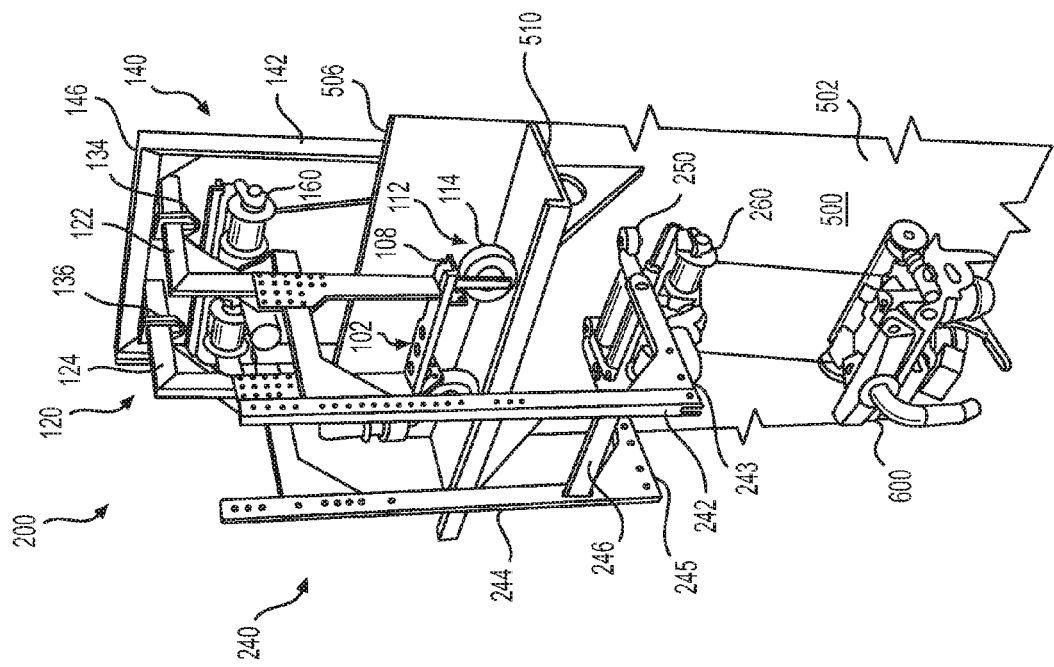
FIG. 9 is a perspective cutaway view of a portion of a sidewall of an external floating roof tank with a representation of the maintenance system support system shown in FIG. 7 mounted on the external floating roof tank, and wherein a maintenance system is mounted on and supported by the maintenance system support system external of the sidewall of the external floating roof tank.

As shown in FIGS. 8-10, the maintenance system support system 200 can be mounted on the wind girder 510 of the sidewall 500 of an external floating roof tank in a configuration similar to that of the maintenance system support system 100 shown in FIG. 4, with the first stanchion 140 positioned on the internal side of the sidewall 500 and the first and the second internal wall contact stabilizers 150 and 152 contacting the internal surface 504 of the sidewall 500. The maintenance system support system 200 can be aligned on the external floating roof tank with the second stanchion 240 positioned on the external side of the sidewall 500. The first and second external legs 242 and 244 are aligned lateral to the second side 106 of the carriage 102 and extend downward beyond the plurality of wheels 112 and the wind girder 510 on which the plurality of wheels 112 are disposed. The first foot 243 and the second foot 245 are aligned inferior to the plurality of wheels 112 and the wind girder 506 and extend laterally toward the sidewall 500. The third external wall contact stabilizer 250 is aligned to contact the external surface 502 of the sidewall 500. A first external support bracket 234 is mounted on the first foot 243 and supports a second hoist 260 to which can be movably mounted a first maintenance system 600, such as a sand blaster or paint sprayer, aligned adjacent the external surface 502 of the sidewall 500 in order to act upon the external surface 502. A second maintenance system 400 can be aligned adjacent the internal surface 504 of the sidewall 500 and be supported by the maintenance system support 120 to which is mounted the hoist 160. The second maintenance system 400 can move in the maintenance system clearance space 121 between the first and the second internal wall contact stabilizers 150 and 152 and act upon the internal surface 504 of the sidewall 500 all the way to the wall top 506.

Figure 11:
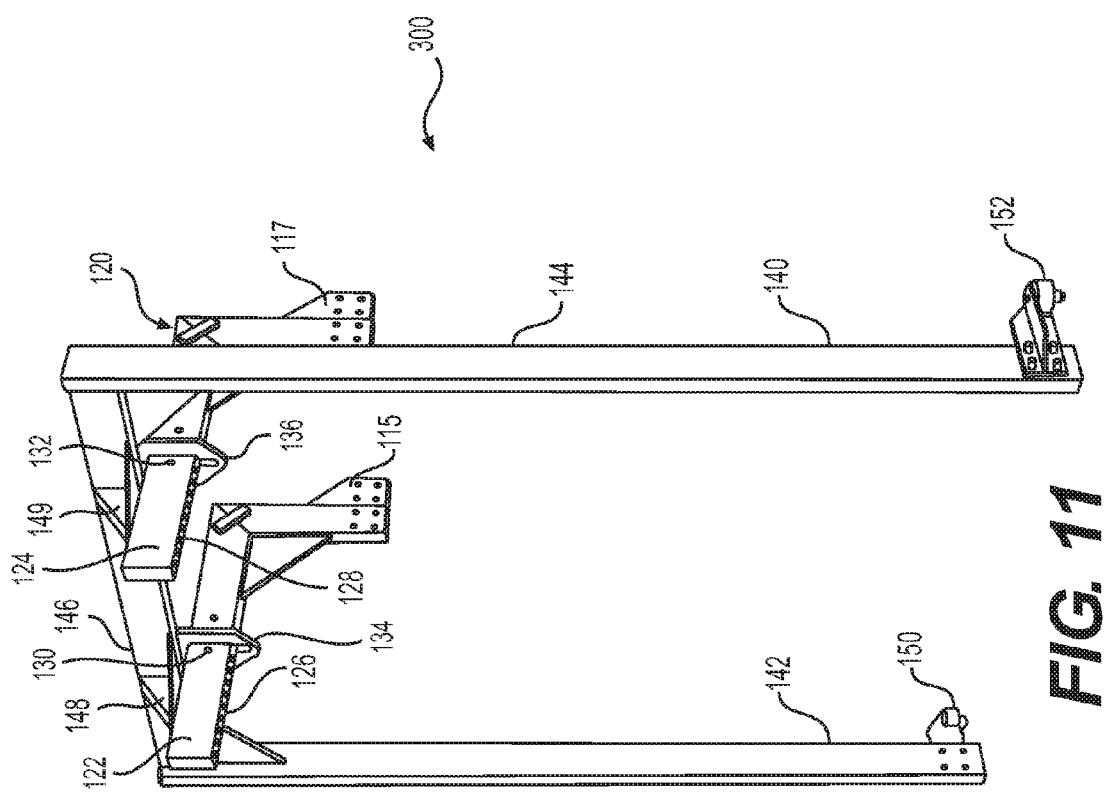
FIG. 11 is a perspective view of a maintenance system support apparatus encompassing aspects of the present disclosure.
Figure 12:
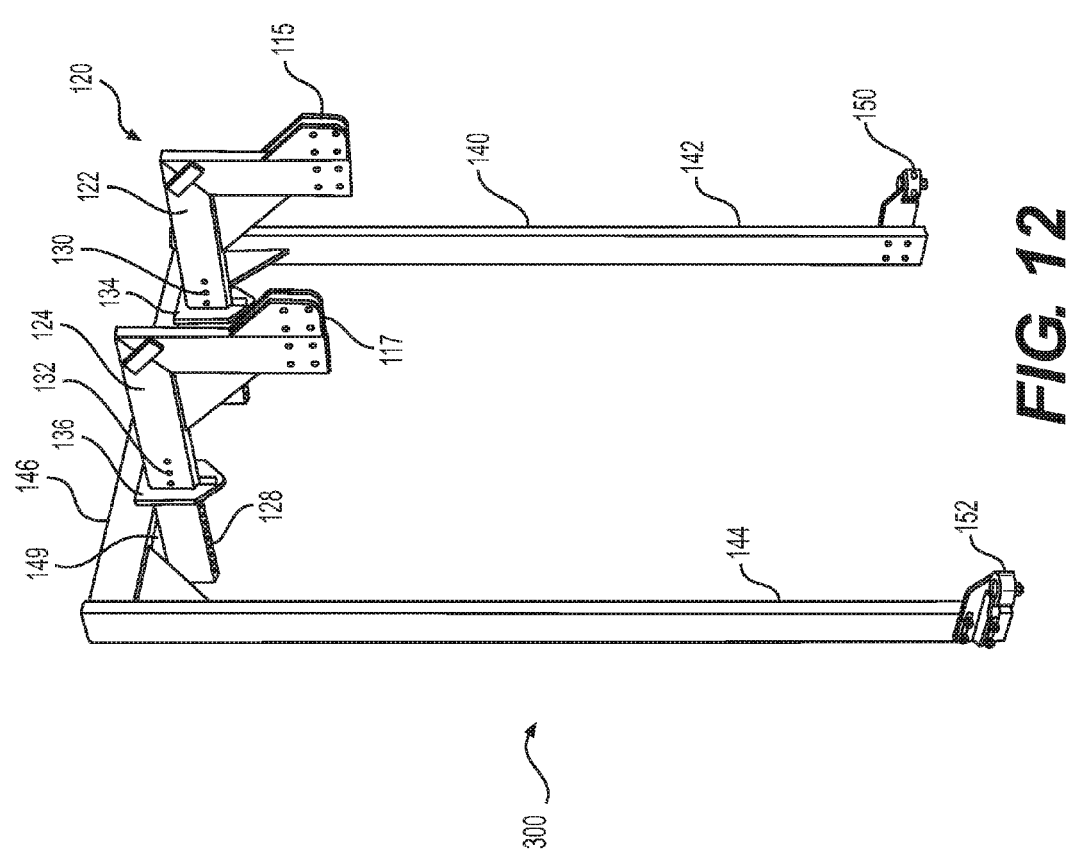
FIG. 12 is another perspective view of the maintenance system support apparatus shown in FIG. 11.
Figure 13:
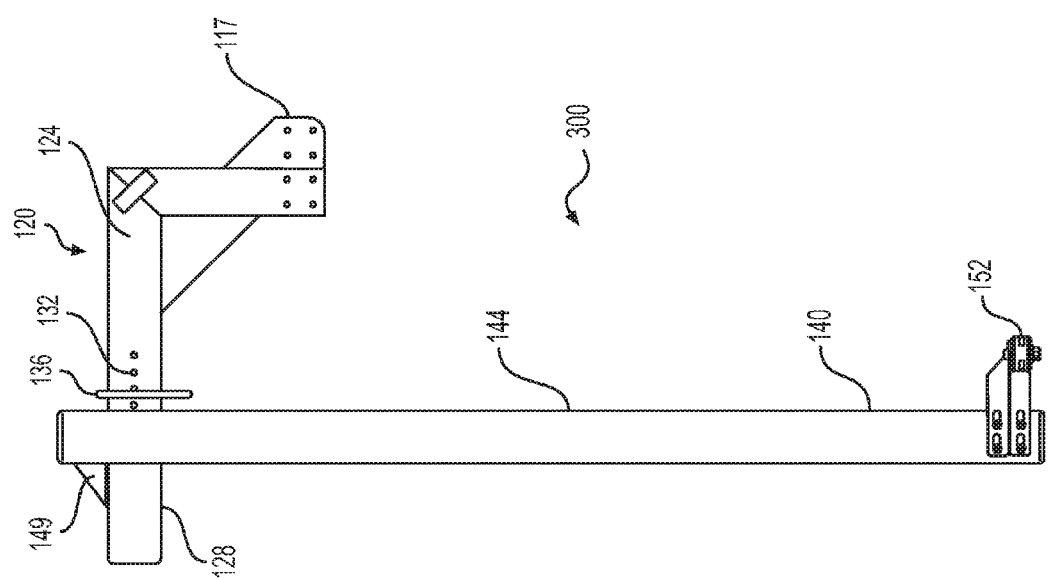
FIG. 13 is a side elevation view of the maintenance system support apparatus shown in FIG. 11.

FIGS. 11-13 show a maintenance system support apparatus 300 encompassing aspects of the present disclosure and that can be attached to an external support system to support a maintenance system operating on an internal surface of a sidewall of an external floating roof tank. The maintenance system support apparatus 300 generally includes a first bracket 115 and a second bracket 117 that can be used to securely mount the apparatus 300 to an existing external maintenance system support system. The apparatus 300 comprises a maintenance system support 120 that includes a first support beam 122 and a second support bean 124 spaced apart and aligned parallel to the first support beam 122. The apparatus 300 further comprises a stanchion 140 that comprises a first internal leg 142, an opposed second internal leg 144 and a cross-member 146 mounted to the first and the second support beams 122 and 124 and extending between the first and the second internal legs 142 and 144. A first internal wall contact stabilizer 150 is mounted to the first internal leg 142 and a second internal wall contact stabilizer 152 is mounted to the second internal leg 144. The apparatus 300 includes two types of adjustment. The first type of adjustment can be of the alignment of the stanchion 140 relative to the first and second brackets 115 and 117. The adjustment of the stanchion can be made by moving the cross-member 146 relative to the first and the second support beams 122 and 124 to a specific alignment and then inserting a fastener into the first bracket 148 and adjustment holes, not shown, formed in the top of the first support beam 122. Likewise, a second fastener can be inserted into the second bracket 149 and adjustment holes formed on the top of the second support beam 124, thereby securing the stanchion 140 to the maintenance system support 120. The second type of adjustment can be made by adjusting the positions of the first support bracket 134 on the first support beam 122 and the second support bracket 136 on the second support beam 124. The first and second support brackets 134 and 136 can be secured in position by engaging a fastener with each support bracket and the corresponding adjustment holes formed in the sides of the respective first and second support beams 122 and 124.

The embodiments set forth herein are provided to illustrate the scope of the present disclosure, but are not provided to limit the scope thereof. The present disclosure contemplates alternative combinations and modifications of the features disclosed herein without departing from the scope thereof Alternatives, variations and modifications of the embodiments described herein will be apparent to one of ordinary skill in the art and are encompassed by the present disclosure.

The invention claimed is:

1. A support system for supporting a maintenance system on an external floating roof tank having a sidewall and a wind girder mounted on the sidewall, the support system comprising:
   a carriage, wherein the carriage comprises a first carriage side, a second carriage side, a first carriage end and a second carriage end;
   a plurality of wheels positionable on the wind girder, wherein the carriage is movably mounted on the plurality of wheels and alignable on an external side of the sidewall;
   a first internal leg and a second internal leg mounted on the carriage, wherein the first internal leg and the second internal leg are proximal to the first carriage side and distal to the second carriage side;
   a first internal wall contact stabilizer mounted on the first internal leg;
   a second internal wall contact stabilizer mounted on the second internal leg, wherein the first internal wall contact stabilizer and the second internal wall contact stabilizer are aligned inferior and lateral to the plurality of wheels, wherein the first internal wall contact stabilizer and the second internal wall contact stabilizer are engageable with an internal surface of the sidewall, and wherein the first internal wall contact stabilizer and the second internal wall contact stabilizer are aligned proximal to the first carriage side and distal to the second carriage side; and,
   a maintenance system support mounted on the carriage, wherein at least a portion of the maintenance system support is aligned superior and intermediate to the first internal wall contact stabilizer and the second internal wall contact stabilizer, and wherein the maintenance system support is alignable superior to a wall top of the sidewall.

2. The support system of claim 1, further comprising a support bracket adjustably mounted on the maintenance system support.

3. The support system of claim 2, wherein the support bracket is adjustably movable from a first alignment proximal to the first carriage side to a second alignment distal to the first carriage side.

4. The support system of claim 1, further comprising a hoist mounted on the maintenance system support.

5. The support system of claim 4, wherein the hoist is aligned superior to the first internal wall contact stabilizer and the second internal wall contact stabilizer.

6. The support system of claim 1, wherein the first internal leg and the second internal leg are adjustably mounted on the carriage, wherein the first internal leg and the second internal leg are adjustably movable from a first alignment proximal to the first carriage side to a second alignment distal to the first carriage side.

7. A support system for supporting a maintenance system on an external floating roof tank comprising:
   a carriage, wherein the carriage comprises a first carriage side, a second carriage side, a first carriage end and a second carriage end;
   a plurality of wheels, wherein the carriage is movably mounted on the plurality of wheels;
   a first internal leg and a second internal leg mounted on the carriage, wherein the first internal leg and the second internal leg are proximal to the first carriage side and distal to the second carriage side;
   a first internal wall contact stabilizer mounted on the first internal leg;
   a second internal wall contact stabilizer mounted on the second internal leg, wherein the first internal wall contact stabilizer and the second internal wall contact stabilizer are aligned inferior and lateral to the plurality of wheels, and wherein the first internal wall contact stabilizer and the second internal wall contact stabilizer are aligned proximal to the first carriage side and distal to the second carriage side; and,
   a maintenance system support mounted on the carriage, wherein at least a portion of the maintenance system support is aligned superior and intermediate to the first internal wall contact stabilizer and the second internal wall contact stabilizer; and, a first external wall contact stabilizer mounted on the carriage, wherein the first external wall contact stabilizer is aligned proximal to the first carriage side and distal to the second carriage side, and wherein the first external wall contact stabilizer is aligned intermediate the carriage and the first internal wall contact stabilizer and the second internal wall contact stabilizer.

8. The support system of claim 7, further comprising a first external leg and a second external leg mounted on the carriage, wherein a portion of the first external leg and a portion of the second external leg are aligned proximal to the second carriage side and distal to the first carriage side, a second external wall contact stabilizer mounted on the first external leg, a third external wall contact stabilizer mounted on the second external leg, wherein the second external wall contact stabilizer and the third external wall contact stabilizer are aligned inferior to the plurality of wheels, and wherein the second external wall contact stabilizer and the third external wall contact stabilizer are aligned proximal to the first carriage side and distal to the second carriage side.

9. The support system of claim 8, further comprising a second maintenance system support mounted on the first external leg and the second external leg.

10. The support system of claim 9, further comprising a hoist mounted on the second maintenance system support.

11. The support system of claim 10, further comprising a first maintenance system mounted on the maintenance system support and a second maintenance system mounted on the second maintenance system support.

12. The support system of claim 1, wherein at least one of the plurality of wheels is remote-controlled.

13. The support system of claim 1, wherein the carriage, the maintenance system support, the first internal leg, the second internal leg, the first internal wall contact stabilizer and the second internal wall contact stabilizer cooperate to define a wall alignment slot therebetween.

14. The support system of claim 13, wherein the maintenance system support, the first internal wall contact stabilizer and the second internal wall contact stabilizer cooperate to define a maintenance system clearance space therebetween, wherein the maintenance system clearance space is aligned adjacent to the wall alignment slot.

15. A support system for supporting a maintenance system usable on an external floating roof tank having a sidewall and a wind girder mounted on the sidewall, the support system comprising:
  a carriage comprising a first carriage side, a second carriage side opposed to the first carriage side, a first carriage end and a second carriage end opposed to the first carriage end, wherein the carriage is alignable on an external side of the sidewall;
  a first wheel and a second wheel operably connected to the carriage, wherein the first wheel and the second wheel are positionable on the wind girder, and wherein the carriage is movably supported on the first wheel and the second wheel;
  a maintenance system support mounted on the carriage, wherein the maintenance system support comprises a first support beam and a second support beam, wherein the first support beam and the second support beam are aligned superior to and extend laterally from the first carriage side;
  a stanchion mounted to the first support beam, wherein the stanchion comprises a first internal leg, a second internal leg spaced apart from the first internal leg, a cross-member disposed between and connected to the first internal leg and the second internal leg, wherein the cross-member is aligned superior to the maintenance system support, wherein the first internal leg and the second internal leg are aligned proximal to the first carriage side and distal to the second carriage side, and wherein the first internal leg and the second internal leg are spaced apart from the first carriage side; and,
  a first internal wall contact stabilizer mounted to the first internal leg and a second internal wall contact stabilizer mounted to the second internal leg, wherein the first internal wall contact stabilizer and the second internal wall contact stabilizer are aligned proximal to the first carriage side and distal to the second carriage side, and the first internal wall contact stabilizer and the second internal wall contact stabilizer are aligned inferior to the first wheel and the second wheel, wherein the first internal wall contact stabilizer and the second internal wall contact stabilizer are aligned lateral to the first carriage side, wherein the first internal wall contact stabilizer and the second internal wall contact stabilizer are engagable with an internal surface of the sidewall, wherein the carriage, the maintenance system support, the first internal leg, the second internal leg, the first internal wall contact stabilizer and the second internal wall contact stabilizer cooperate to define a wall alignment slot therebetween, wherein a portion of the sidewall is alignable within the wall alignment slot, and wherein the maintenance system support, the first internal wall contact stabilizer and the second internal wall contact stabilizer cooperate to define a maintenance system clearance space therebetween, wherein the maintenance system clearance space is aligned adjacent to the wall alignment slot.

16. A support system for supporting a maintenance system usable on an external floating roof tank comprising:
  a carriage comprising a first carriage side, a second carriage side opposed to the first carriage side, a first carriage end and a second carriage end opposed to the first carriage end;
  a first wheel and a second wheel operably connected to the carriage, wherein the carriage is movably supported on the first wheel and the second wheel;
  a maintenance system support mounted on the carriage, wherein the maintenance system support comprises a first support beam and a second support beam, wherein the first support beam and the second support beam are aligned superior to and extend laterally from the first carriage side;
  a stanchion mounted to the first support beam, wherein the stanchion comprises a first internal leg, a second internal leg spaced apart from the first internal leg, a cross-member disposed between and connected to the first internal leg and the second internal leg, wherein the cross-member is aligned superior to the maintenance system support, wherein the first internal leg and the second internal leg are aligned proximal to the first carriage side and distal to the second carriage side, and wherein the first internal leg and the second internal leg are spaced apart from the first carriage side; and,
  a first internal wall contact stabilizer mounted to the first internal leg and a second internal wall contact stabilizer mounted to the second internal leg, wherein the first internal wall contact stabilizer and the second internal wall contact stabilizer are aligned proximal to the first carriage side and distal to the second carriage side, and the first internal wall contact stabilizer and the second internal wall contact stabilizer are aligned inferior to the first wheel and the second wheel, wherein the first internal wall contact stabilizer and the second internal wall contact stabilizer are aligned lateral to the first carriage side, wherein the carriage, the maintenance system support, the first internal leg, the second internal leg, the first internal wall contact stabilizer and the second internal wall contact stabilizer cooperate to define a wall alignment slot therebetween, and wherein the maintenance system support, the first internal wall contact stabilizer and the second internal wall contact stabilizer cooperate to define a maintenance system clearance space therebetween, wherein the maintenance system clearance space is aligned adjacent to the wall alignment slot, and wherein the stanchion is adjustably mounted to the maintenance system support.

17. A support system for supporting a maintenance system usable on an external floating roof tank comprising:
a carriage comprising a first carriage side, a second carriage side opposed to the first carriage side, a first carriage end and a second carriage end opposed to the first carriage end;
a first wheel and a second wheel operably connected to the carriage, wherein the carriage is movably supported on the first wheel and the second wheel;
a maintenance system support mounted on the carriage, wherein the maintenance system support comprises a first support beam and a second support beam, wherein the first support beam and the second support beam are aligned superior to and extend laterally from the first carriage side;
a stanchion mounted to the first support beam, wherein the stanchion comprises a first internal leg, a second internal leg spaced apart from the first internal leg, a cross-member disposed between and connected to the first internal leg and the second internal leg, wherein the cross-member is aligned superior to the maintenance system support, wherein the first internal leg and the second internal leg are aligned proximal to the first carriage side and distal to the second carriage side, and wherein the first internal leg and the second internal leg are spaced apart from the first carriage side; and,
a first internal wall contact stabilizer mounted to the first internal leg and a second internal wall contact stabilizer mounted to the second internal leg, wherein the first internal wall contact stabilizer and the second internal wall contact stabilizer are aligned proximal to the first carriage side and distal to the second carriage side, and the first internal wall contact stabilizer and the second internal wall contact stabilizer are aligned inferior to the first wheel and the second wheel, wherein the first internal wall contact stabilizer and the second internal wall contact stabilizer are aligned lateral to the first carriage side, wherein the carriage, the maintenance system support, the first internal leg, the second internal leg, the first internal wall contact stabilizer and the second internal wall contact stabilizer cooperate to define a wall alignment slot therebetween, and wherein the maintenance system support, the first internal wall contact stabilizer and the second internal wall contact stabilizer cooperate to define a maintenance system clearance space therebetween, wherein the maintenance system clearance space is aligned adjacent to the wall alignment slot, and a first support bracket connected to the first support beam and a second support bracket connected to the second support beam.

18. The support system of claim 15, further comprising a hoist mounted on the maintenance system support.

19. A support system for supporting a maintenance system usable on an external floating roof tank comprising:
a carriage comprising a first carriage side, a second carriage side opposed to the first carriage side, a first carriage end and a second carriage end opposed to the first carriage end;
a first wheel and a second wheel operably connected to the carriage, wherein the carriage is movably supported on the first wheel and the second wheel;
a maintenance system support mounted on the carriage, wherein the maintenance system support comprises a first support beam and a second support beam, wherein the first support beam and the second support beam are aligned superior to and extend laterally from the first carriage side;
a stanchion mounted to the first support beam, wherein the stanchion comprises a first internal leg, a second internal leg spaced apart from the first internal leg, a cross-member disposed between and connected to the first internal leg and the second internal leg, wherein the cross-member is aligned superior to the maintenance system support, wherein the first internal leg and the second internal leg are aligned proximal to the first carriage side and distal to the second carriage side, and wherein the first internal leg and the second internal leg are spaced apart from the first carriage side; and,
a first internal wall contact stabilizer mounted to the first internal leg and a second internal wall contact stabilizer mounted to the second internal leg, wherein the first internal wall contact stabilizer and the second internal wall contact stabilizer are aligned proximal to the first carriage side and distal to the second carriage side, and the first internal wall contact stabilizer and the second internal wall contact stabilizer are aligned inferior to the first wheel and the second wheel, wherein the first internal wall contact stabilizer and the second internal wall contact stabilizer are aligned lateral to the first carriage side, wherein the carriage, the maintenance system support, the first internal leg, the second internal leg, the first internal wall contact stabilizer and the second internal wall contact stabilizer cooperate to define a wall alignment slot therebetween, and wherein the maintenance system support, the first internal wall contact stabilizer and the second internal wall contact stabilizer cooperate to define a maintenance system clearance space therebetween, wherein the maintenance system clearance space is aligned adjacent to the wall alignment slot, and a first external wall contact stabilizer mounted on the carriage, wherein the first external wall contact stabilizer is aligned proximal to the first carriage side and distal to the second carriage side, and wherein the first external wall contact stabilizer is intermediate the first carriage side and the first internal wall contact stabilizer and the second internal wall contact stabilizer.

* * * * *